(12) United States Patent
Yang et al.

(10) Patent No.: US 9,405,323 B2
(45) Date of Patent: Aug. 2, 2016

(54) WEARABLE ELECTRONIC DEVICE

(71) Applicants: SHENZHEN FUTAIHONG PRECISION INDUSTRY CO., LTD., Shenzhen (CN); FIH (HONG KONG) LIMITED, Kowloon (HK)

(72) Inventors: Nai-Lin Yang, New Taipei (TW); Bing Zhang, Shenzhen (CN); Qiang Wang, Shenzhen (CN); Shao-Lin Yang, Shenzhen (CN); Wen-Bin Sun, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/553,401

(22) Filed: Nov. 25, 2014

(65) Prior Publication Data

US 2016/0034002 A1 Feb. 4, 2016

(30) Foreign Application Priority Data

Aug. 1, 2014 (CN) .......................... 2014 1 0375856

(51) Int. Cl.
*G06F 1/16* (2006.01)
(52) U.S. Cl.
CPC .............. *G06F 1/1656* (2013.01); *G06F 1/163* (2013.01)

(58) Field of Classification Search
CPC ..... G06F 1/163; G06F 1/1637; G06F 1/1656; G06F 1/16
USPC ............... 361/679.01–679.09, 679.1–679.19, 361/679.21–679.29, 679.31–679.45, 361/679.55–679.6; 368/281–283
See application file for complete search history.

(56) References Cited

U.S. PATENT DOCUMENTS

| | | | | |
|---|---|---|---|---|
| 6,164,814 A * | 12/2000 | Crow | ................... | G04B 19/283 368/276 |
| 2006/0018202 A1 * | 1/2006 | Girardin | ............ | A44C 15/0025 368/281 |
| 2007/0189127 A1 * | 8/2007 | Pollak | ................ | G04B 45/0084 368/294 |
| 2009/0303843 A1 * | 12/2009 | Albano | ................ | G04B 47/042 368/281 |
| 2012/0087215 A1 * | 4/2012 | Fantoni | ................... | G04B 37/14 368/281 |

* cited by examiner

*Primary Examiner* — Hoa C Nguyen
*Assistant Examiner* — Sagar Shrestha
(74) *Attorney, Agent, or Firm* — ScienBiziP, P.C.

(57) ABSTRACT

A wearable electronic device includes a housing, an electronic module received in the housing, and a cover assembly. The cover assembly includes a cover and a rotating member. A first end of the rotating member is rotatably connected to the cover. A second end of the rotating member is detachably latched to the cover. When the rotating member is latched to the cover, the rotating member resists against the housing.

16 Claims, 5 Drawing Sheets

WEARABLE ELECTRONIC DEVICE

CROSS-REFERENCE TO RELATED APPLICATION

This application is related to co-pending U.S. patent application Ser. No. 14/551,825, entitled "WEARABLE ELECTRONIC DEVICE", and invented by Yang et al. The related application has the same assignee as the present application and has been concurrently filed herewith. The above-identified application is incorporated herein by reference.

FIELD

The subject matter herein generally relates wearable electronic devices, and particularly to a wearable electronic device having a changeable appearances.

BACKGROUND

Electronic devices are commonplace throughout most of the world today. Advancements in integrated circuit technology have enabled the development of electronic devices that are sufficiently small and lightweight. Wearable electronic devices such as smart watches, smart eyeglasses, electronic rings, etc. appear and become popular because of the convenience of carrying and using. The wearable electronic devices are mostly attached or coupled to the wrist, neck and face of users. Except for pursuing of multifunction of the wearable electronic devices, the users also pay more attention to their appearance. However, a housing of the wearable electronic devices are commonly undetectable. Thus, it is difficult for the users to obtain a new appearance by changing the housing.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
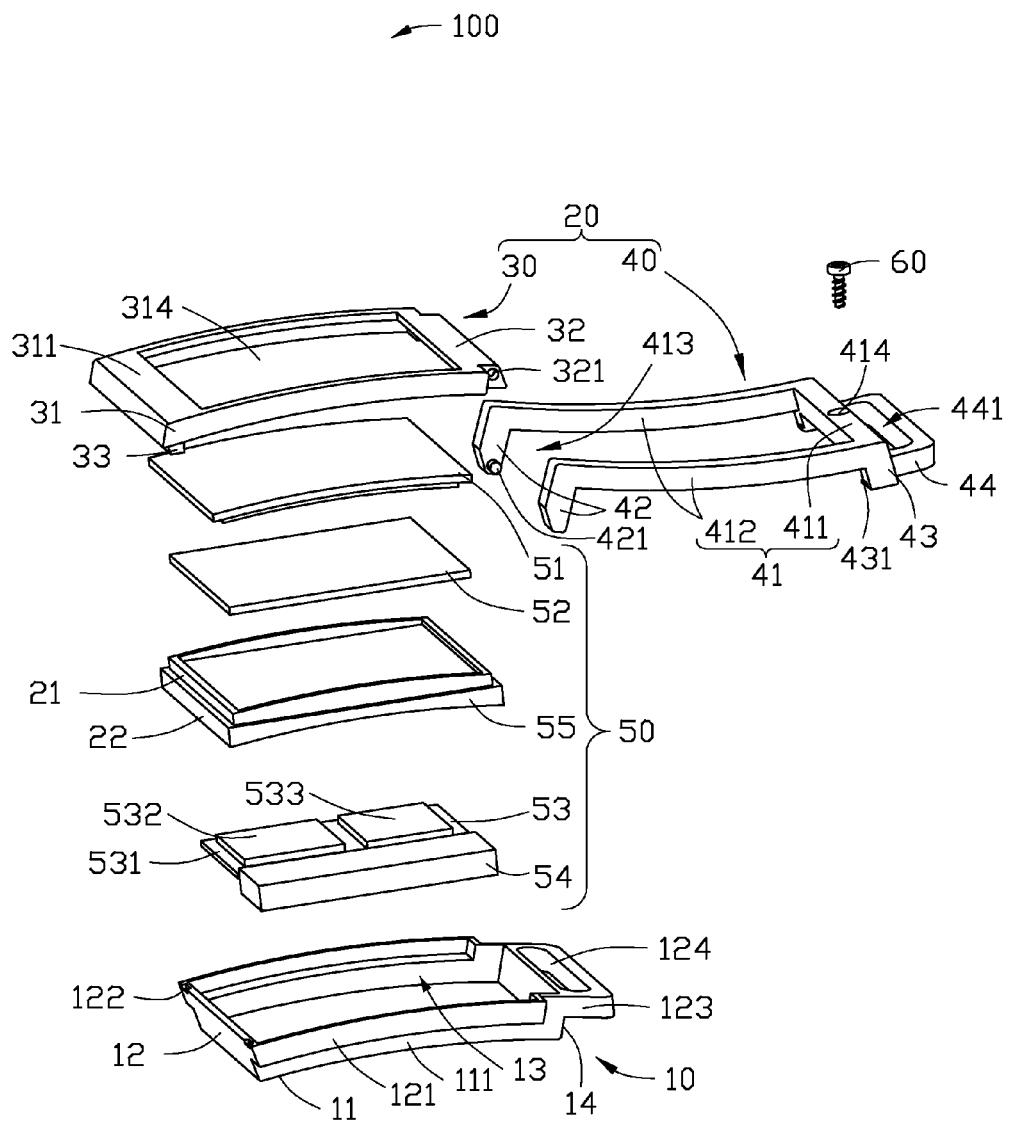
FIG. 1 is a disassembled, isometric view of a wearable electronic device, according to an exemplary embodiment.

FIG. 1 is an isometric view of a wearable electronic device 100, according to an embodiment. The electronic device 100 may be a smart watch, a health bracket, or a smart pendant. The electronic device 100 includes a housing 10, a cover assembly 20, an electronic module 50, and a fastening member 60.

Figure 2:
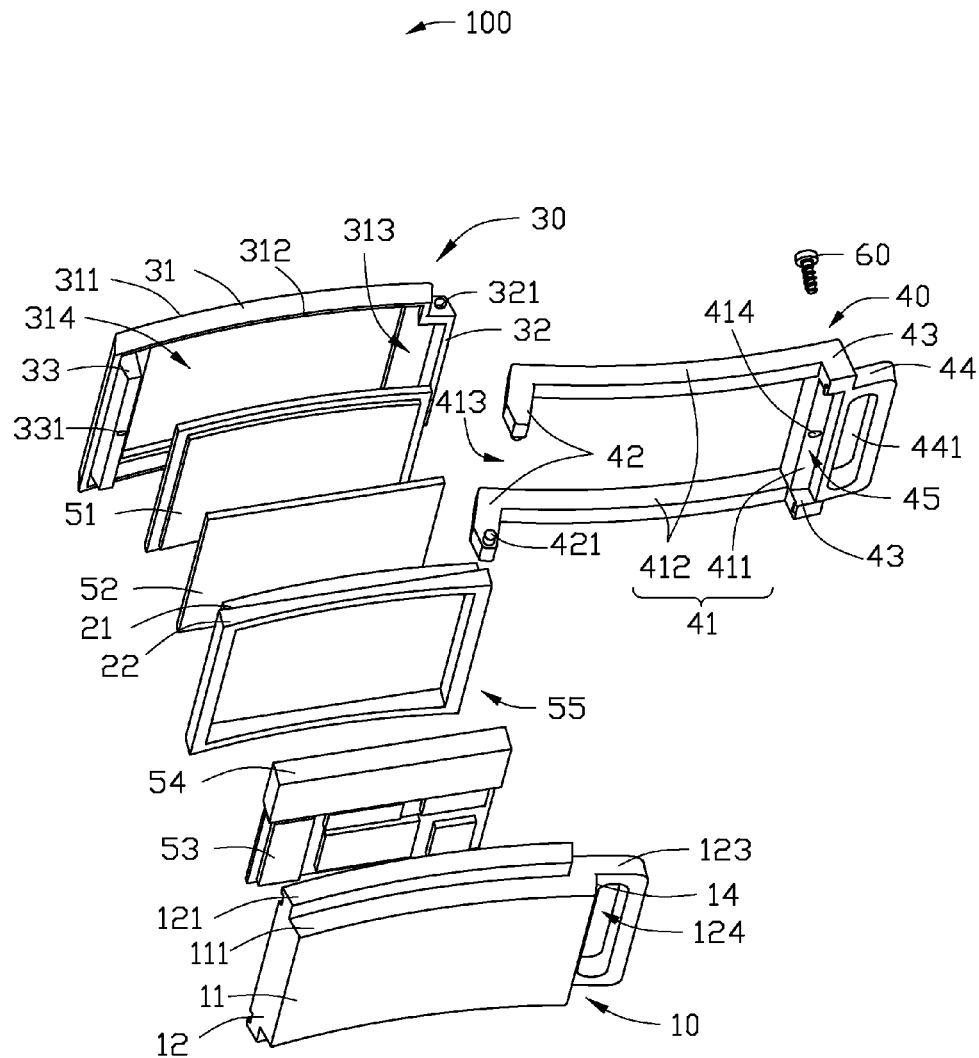
FIG. 2 is similar to FIG. 1, but shown from another angle.

FIG. 2 shows that, the housing 10 includes a bottom wall 11, two opposite sidewalls 111, a first end 12, and a second end 14 opposite to the first end 12. The sidewalls 111, the first end 12, and the second end 14 perpendicularly extend from peripheral edges of the bottom wall 11 and surround the bottom wall 11 to cooperatively form a receiving cavity 13 with the bottom wall 11. A stepped portion 121 protrudes from each sidewall 111. Two notches 122 are defined in the first end 12 and spaced from each other. A substantial rectangular first connecting portion 123 protrudes from the second end 14. A first connecting hole 124 is defined in a center portion of the first connecting portion 123.

The cover assembly 20 includes a cover 30 and a rotating member 40 rotatably connected to the cover 30 configured for latching the housing 10 with the cover 30

The cover 30 includes a frame 31, a mounting portion 32, and a latching block 33. The frame 31 is slightly curved and includes an outer surface 311 and an inner surface 312 opposite to the outer surface 311. A receiving recess 313 is defined in the inner surface 312. A window 314 is defined in the receiving recess 313. The mounting portion 32 protrudes from an end of the frame 31. Two shaft holes 321 are defined in two ends of the mounting portion 32. The latching block 33 protrudes from a bottom of the receiving recess 313. A first securing hole 331 is defined in a center of the latching block 33.

The rotating member 40 includes a latching frame 41, two rotating arms 42, two protrusions 43, and a second connecting portion 44.

The latching frame 41 is substantially U-shaped and includes a first latching arm 411 and two second latching arms 412 perpendicularly connected to two ends of the first latching arm 411. An opening 413 is formed between the two second latching arms 412 opposite to the first latching arm 411. A width of the opening 413 is substantially equal to a length of the mounting portion 32. Each rotating arm 42 is perpendicularly extended from a first end of one of the second latching arms 412 adjacent to the opening 413. A rotating shaft 421 protrudes from each rotating arm 42 corresponding to one of the shaft holes 321. The protrusions 43 protrude from two ends of the first latching arm 411 and cooperatively form a latching slot 45 with the first latching arm 411 corresponding to the latching block 33. A hook 431 protrudes from a side surface of each protrusion 43 facing the rotating arms 42. The hooks 431 correspond to the notches 122. The second connecting portion 44 protrudes from a side of the first latching arm 411 between the two protrusions 43. A second connecting hole 441 is defined in a center of the second connecting portion 44.

The electronic module 50 includes a case 55 and an electronic assembly received in the housing 55.

The case 55 includes a first receiving chamber 21 and a second receiving chamber 22 overlapped on the first receiving chamber 21.

The electronic assembly includes a first panel 51, a second panel 52, a circuit board unit 53, and a battery 54. The first panel 51 and the second panel 52 may be a touch panel and a liquid crystal display panel. The first panel 51 and the second panel 52 are overlapped together to form a display unit. The circuit board unit 53 includes a circuit board 531, a plurality of microchips 532, and a plurality of electronic members 533. The microchips 532 and the electronic members 533 are electronically connected to each other by circuits printed on the circuit board 531.

The display unit is received in the first receiving chamber 21. The circuit board assembly 53 and the battery 54 are received in the second receiving chamber 22.

Figure 3:
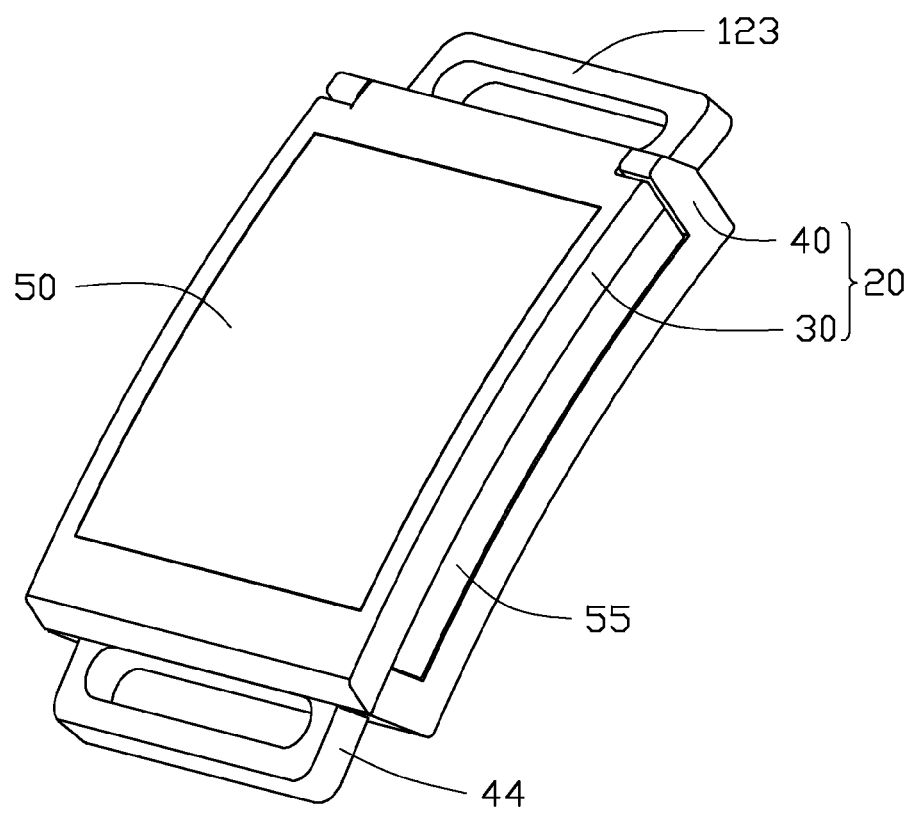
FIG. 3 is an assembled view of the wearable electronic device of FIG. 1.

FIG. 3 shows that, in assembly, each rotating shaft 421 is rotatably received in the corresponding shaft hole 321 so that the rotating member 40 is rotatably connected to the cover 30. The cover 30 covers the housing 10 with the electronic module 50 received in the receiving cavity 13 and the receiving recess 313. The display unit is exposed from the cover 30 via the window 314. The latching block 33 resists against the first end 12. The rotating arms 42 is rotated relative to the cover 30 until the first connecting portion 123 passes through the opening 413, and the second latching arms 412 resists against the stepped portions 121. The latching block 33 engages with the latching slot 45 to latch the rotating member 40 to the cover 30 and sandwich the housing 10 between the rotating member 40 and the cover 30. In addition, the hook 431 latches into the notches 122 to fix the housing 10. The first fixing hole 331 aligns with the second fixing hole 414. The fastening member 60 passes through the second fixing hole 414 and the first fixing hole 331 and fastens the rotating member 40 and the cover 30 together. The first connecting portion 123 and the second connecting portion 44 are positioned at two sides of the cover 30.

Figure 4:
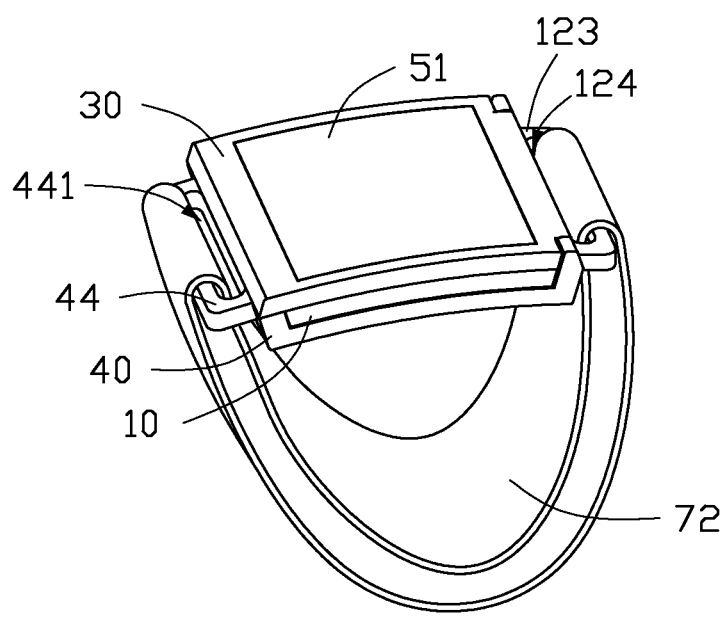
FIG. 4 is an isometric view of the wearable electronic device of FIG. 1 in a using state.

FIG. 4 shows that, the electronic device 100 further includes a wearing member 70 which may be a wristband 72. The wristband 72 extends through the first and second connecting holes 124, 441 and connected to the first and second connecting portions 123, 44. Thus, the wearing member 70 enables the electronic device 100 to be carried about the wrist of a user.

Figure 5:
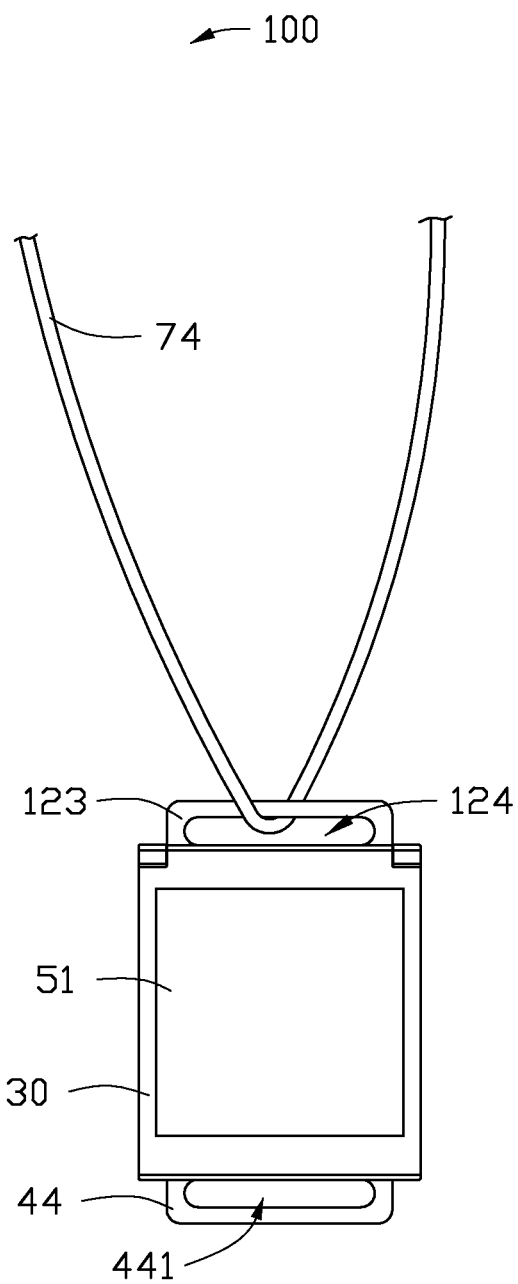
FIG. 5 is an isometric view of the wearable electronic device of FIG. 1 in a using state.

FIG. 5 shows that, the wearing member may be a neck strap 74 extending through one of the first and second connecting holes 124, 441 and connected to one of the first and second connecting portions 123, 44. Thus, the wearing member 50 enables the electronic device 100 to be carried about the neck of the user.

The housing 10 and the cover 30 can be designed to be circle, heart-shaped, etc. Therefore, the electronic device 100 can obtain different appearances by detaching and changing the housing 10 and the cover 30 to satisfy different requirements of the user.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A wearable electronic device comprising:
   a housing comprising a bottom wall, two opposite side walls, a first end, and a second end opposite to the first end, wherein the side walls, the first end, and the second end are perpendicularly extended from a peripheral edge of the bottom wall, each side wall comprises a stepped portion;
   an electronic module received in the housing; and
   a cover assembly, comprising:
      a cover covering the housing; and
      a rotating member, a first end of the rotating member being rotatably connected to the cover, a second end of the rotating member being detachably latched to the cover; wherein when the rotating member is latched to the cover, the rotating member resists against the stepped portions.

2. The wearable electronic device of claim 1, wherein the cover comprises a frame and a connecting portion protruding from an end of the frame; the rotating member comprises a latching frame rotatably connected to the connecting portion, when the rotating member is latched to the cover, the latching frame resists against the housing.

3. The wearable electronic device of claim 2, wherein the latching frame comprises a first latching arm and two second latching arms perpendicularly connected to two ends of the first latching arm, the second latching arms are rotatably connected to the connecting portions.

4. The wearable electronic device of claim 2, wherein the connecting portion defines two shaft holes, the rotating member further comprises two rotating arms extending from the latching frame, each rotating arm comprises a rotating shaft protruding from one side of the rotating arm, the rotating shafts are rotatably received in the shaft holes.

5. The wearable electronic device of claim 3, wherein the rotating member comprises two protrusions protruding from two ends of the first latching arm, the protrusions cooperatively form a latching slot with the first latching arm; the cover comprises a latching block protruding from the frame facing the housing, the latching block is detachably latch to the latching slot.

6. The wearable electronic device of claim 5, wherein each protrusion comprising a hook protruding from a side surface of each latching block, the housing defines two notches, the hooks engage in the notches.

7. The wearable electronic device of claim 1, wherein the housing comprises a first connecting portion that protrudes from an end of the housing, the rotating member comprises a second connecting portion.

8. The wearable electronic device of claim 7, further comprising a neck wrap connected to one of the first connecting portion and the second connecting portion.

9. The wearable electronic device of claim 7, further comprising a wristband connected to the first connecting portion and the second connecting portion.

10. A wearable electronic device comprising:
   a housing comprising a bottom wall, two opposite side walls, a first end, and a second end opposite to the first end, wherein the side walls, the first end, and the second end are perpendicularly extended from a peripheral edge of the bottom wall, each side wall comprises a stepped portion;
   a core module received in the housing; and
   a cover assembly, comprising:
      a cover covering the housing; and
      a rotating member, a first end of the rotating member being rotatably connected to the cover, a second end of the rotating member being detachably latched; wherein when the rotating member is latched to the cover, the housing is sandwiched between the rotating member and the cover and the rotating member resist against the stepped portions.

11. The wearable electronic device of claim 10, wherein the cover comprises a frame and a connecting portion protruding from an end of the frame; the rotating member comprises a latching frame rotatably connected to the connecting portion, when the rotating member is latched to the cover, the latching frame resists against the housing.

12. The wearable electronic device of claim 11, wherein the latching frame comprises a first latching arm and two second latching arms perpendicularly connected to two ends of the first latching arm, the second latching arms are rotatably connected to the connecting portions.

13. The wearable electronic device of claim 11, wherein the connecting portion defines two shaft holes, the rotating member further comprises two rotating arms extending from the latching frame, each rotating arm comprises a rotating shaft protruding from one side of the rotating arm, the rotating shafts are rotatably received in the shaft holes.

14. The wearable electronic device of claim 12, wherein the rotating member comprises two protrusions protruding from two ends of the first latching arm, the protrusion cooperatively form a latching slot with the first latching arm; the cover comprises a latching block protruding from the frame facing the housing, the latching block is detachably latched to the latching slot.

15. The wearable electronic device of claim 14, wherein each protrusion comprising a hook protruding from a side surface of each latching block, the housing defines two notches, the hooks engage in the notches.

16. The wearable electronic device of claim 10, wherein the housing further comprises a first connecting portion that protrudes from an end of the housing, the rotating member further comprises a second connecting portion.

* * * * *